Figure 1:
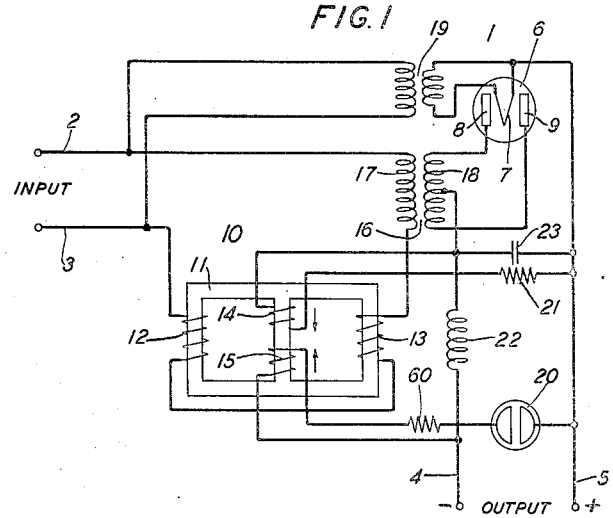

Oct. 12, 1943.    L. E. MILARTA    2,331,411
REGULATED RECTIFIER
Filed Nov. 7, 1940

INVENTOR
L. E. MILARTA
BY
Wayne B Wells
ATTORNEY

Patented Oct. 12, 1943

2,331,411

UNITED STATES PATENT OFFICE 2,331,411

REGULATED RECTIFIER

Louis E. Milarta, Hollis, N. Y., assignor to Bell Telephone Laboratories, Incorporated, New York, N. Y., a corporation of New York Application November 7, 1940, Serial No. 364,641

17 Claims. (Cl. 175—363)

This invention relates to regulated rectifier circuits and particularly to regulated rectifier circuits for controlling the current and the voltage on a load circuit.

One object of the invention is to provide a regulated rectifier connected between an alternating current supply circuit and a direct current load circuit that shall maintain the load current substantially constant and prevent the load voltage going above a predetermined value.

Another object of the invention is to provide a regulated rectifier having a rectifier connected between an alternating current supply circuit and a direct current load circuit with an inductive impedance in the supply circuit adjacent the rectifier that shall control the impedance according to load circuit resistance to maintain the load current substantially constant and prevent the load voltage going above a predetermined value.

A further object of the invention is to provide a regulated rectifier having a rectifier connected between a constant potential alternating current supply circuit and a direct current load circuit with a reactor in the supply circuit adjacent to the rectifier that shall control said reactor according to the load circuit voltage to maintain the load current substantially constant while pre-rectifief that shall control the impedance accord-termined value.

In certain classes of work it is desirable to supply a constant direct current from an alternating current supply circuit. In maintaining the load current constant over a given range it may be necessary to prevent excessive current flow in case of a short circuit on the load circuit or to prevent excessive voltage on the load circuit when the load circuit is opened.

In a regulated rectifier constructed in accordance with the invention a rectifier of any suitable type is connected between an alternating current supply circuit and a direct current load circuit. An inductive impedance is connected in the supply circuit adjacent to the rectifier for governing the current and voltage characteristics of the load circuit. The impedance is so controlled by feedback circuits from the load circuit as to maintain the load current constant while preventing the load voltage going above a predetermined value.

In one form of the invention an alternating current supply circuit having a constant potential is connected to the full wave rectifier by a transformer. The full wave rectifier may be of any suitable type and preferably is of the space discharge type. A three-legged reactor is inserted in the primary circuit of the transformer for controlling the characteristics of the direct current load circuit. Two alternating current windings are respectively mounted on the outside core legs. The two alternating current windings produce flux in series-aiding relation and are connected in series with the supply circuit. Two direct current windings are mounted on the central core leg and produce fluxes in opposition to each other.

One of the direct current windings mounted on the central leg of the reactor is energized according to the potential across the load circuit in order to maintain the load circuit current substantially constant. It is possible to maintain the load circuit current constant by controlling the reactor according to the load circuit voltage because the supply circuit voltage is constant. If all the elements of the circuit are referred to the supply side the circuit consists essentially of a variable resistance R which includes the load resistance, in series with the variable reactance of the reactor.

Therefore $$I = \frac{E}{\sqrt{R^2 + X^2}}$$

It is possible to maintain I constant over a wide range of R if X is varied so as to keep the sum $R^2 + X^2$ constant. The second direct current winding is connected across the load circuit in series with a cold cathode tube. The second direct current winding serves to limit the voltage on the supply circuit whenever the supply circuit voltage would otherwise rise to a predetermined excessive value, as in the case of an open circuit. The cold cathode tube breaks down and energizes the second direct current winding to prevent any further rise in voltage. The first direct current winding controls the reactor, not only to maintain constant current on the load circuit but also to prevent excessive current flow in the case of a short circuit. The second direct current winding controls the reactor to prevent excessive voltage on the load circuit whenever the load circuit is opened.

Figure 2:
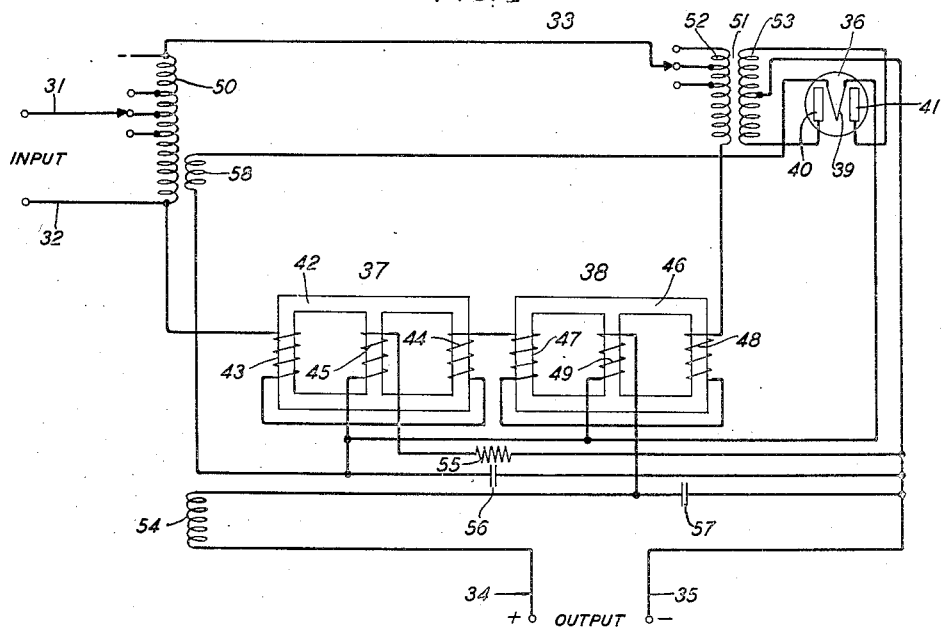

In the accompanying drawing:

Fig. 1 is a diagrammatic view of a regulated rectifier constructed in accordance with the invention; and Fig. 2 is a modification of the regulated rectifier circuit shown in Fig. 1.

Referring to Fig. 1 of the drawing, a regulated rectifier 1 is shown connected between an alternating current supply circuit, comprising conductors 2 and 3 and a direct current load circuit comprising conductors 4 and 5. The supply circuit is assumed to have substantially constant voltage and the direct current load circuit is controlled by the regulated rectifier to maintain the current substantially constant.

The regulated rectifier comprises a full wave rectifier tube 6 having a cathode 7 and two anodes 8 and 9 and a reactor 10 having a three-legged core 11 and two alternating current windings 12 and 13 respectively mounted on the outside legs of the core 11 and two direct current windings 14 and 15 mounted on the central core leg. A transformer 16 having a primary winding 17 and a secondary winding 18 is connected between the rectifier tube 6 and the supply circuit. The two alternating current windings 12 and 13 are connected in series with the primary winding 17 of the transformer 16. A transformer 19 is connected across the supply circuit for energizing the filament 7 of the rectifier 6.

The direct current winding 15 on the central leg of the core 11 is connected across the load conductors 4 and 5 in series with a resistance element 60 and a cold cathode tube 20. The cold cathode tube 20 is ignited whenever the voltage on the load circuit is raised to a predetermined value. The direct current winding 14 on the central leg of the core 11 is connected across the load circuit in series with a resistance 21. The flux produced by the direct current winding 14 opposes the flux produced by the direct current winding 15. The direct current winding 14 serves to maintain substantially constant current on the load circuit and to prevent excessive current flow in case of a short circuit on the load circuit. The direct current winding 15 serves to prevent excessive voltage on the load circuit whenever the load circuit is opened.

The input circuit connected to the primary winding 17 of the transformer 16 may be traced from the conductor 2 through the primary winding 17 and the alternating current windings 13 and 12 of the reactor 10 to the supply conductor 3. The load circuit connected to the secondary winding 18 of the transformer 16 through the rectifier 6 may be traced from the load conductor 5 through the filament 7, anode 8 or anode 9, one-half of the secondary winding 18 and the retard coil 22 to the load conductor 4. A condenser 23 which is connected across the load circuit operates with the retard coil 22 to suppress any ripples in the rectified current.

Inasmuch as constant voltage is supplied to the regulated rectifier it is possible to control the load current by varying an impedance in series with the supply circuit according to the load circuit voltage and maintain the load current constant. The impedance of the reactor 10 in series with the primary winding 17 of the transformer 16 is controlled by the winding 14 according to the potential across the load circuit. If the current on the load circuit goes above normal value the potential across the load circuit is reduced to reduce the flux produced by the winding 14. This increases the impedance produced by the windings 12 and 13 in series with the primary winding 17 of the transformer 16 to reduce the current flow through the load circuit. In case of a short circuit on the load circuit the impedance of the reactor 10 is increased to such an extent as to insure against excessive current flow on the load circuit.

When the load circuit is opened the winding 14 will be operated in a manner to reduce the impedance of the reactor 10 and raise the voltage on the load circuit. In order to prevent excessive voltage on the load circuit the cold cathode tube 20 is ignited to energize the direct current winding 15 on the central leg of the core 11. The flux produced by the winding 15 opposes the flux produced by the winding 14 so as to increase the impedance of the reactor 10 and limit the voltage on the load circuit. The resistance 60 in series with the cold cathode tube 20 serves to limit the direct current flow through the winding 15 to a suitable value. It is necessary to limit the current flow through the winding 15 in order to prevent the load voltage being decreased below the sustaining voltage for the tube 20. If a sustaining voltage is not maintained on the tube 20 a hunting action will take place.

Referring to Fig. 2 of the drawing, a supply circuit comprising conductors 31 and 32 is connected to a regulated rectifier 33 for supplying substantially constant direct current to a load circuit comprising conductors 34 and 35. The regulated rectifier comprises a full wave rectifier tube 36 and two reactors 37 and 38. The rectifier tube 36 comprises a cathode 39 and two anodes 40 and 41. The reactor 37 comprises a three-legged core 42 having two alternating current windings 43 and 44, respectively mounted on the outside core legs and a direct current winding 45 mounted on the central core leg. The reactor 38 comprises a three-legged core 46 having two alternating current windings 47 and 48, respectively mounted on the outside core legs and a direct current winding 49 mounted on the central core leg.

The supply circuit comprising conductors 31 and 32 is connected to the rectifier tube 36 by means of an adjustable auto-transformer 50 and a transformer 51 having a primary winding 52 and a secondary winding 53. The four alternating current windings 43, 44, 47 and 48 of the reactors 37 and 38 are connected in series with the primary winding 52 of the transformer 51. The direct current winding 49 of the reactor 38 is connected in series with the load conductors 34 and 35. The circuit through the winding 49 may be traced from the load conductor 34 through a retard coil 54, winding 49, cathode 39, anode 40 or anode 41 and secondary winding 53 to the load conductor 35. The reactor 38, having a direct current winding 49 in series with the load circuit, serves to prevent the voltage on the load circuit going above a predetermined value under conditions of high load resistance. The direct current winding 45 of the reactor 37 is connected across the load conductors 34 and 35. The circuit through the direct current winding 45 may be traced from the conductor 35 through a resistance element 55, winding 45, winding 49 and the retard coil 54 to the load conductor 34. The resistance element 55 serves to adjust the operation of the reactor 37. The reactor 37 which has a direct current winding 45 substantially connected across the load conductors 34 and 35 serves to prevent the load current from going above a predetermined value.

The reactor 37 has its impedance so varied as to maintain substantially constant current on the load conductors 34 and 35. This reactor 37 also serves to prevent excessive current flow on the load circuit in case of a short circuit. The reactor 38 has its impedance so varied or controlled as to prevent excessive voltage on the load circuit. The reactor 38 insures against the voltage on the load circuit going above a predetermined value. Condensers 56 and 57 in combination with the retard coil 54 serves as a filter to prevent ripples on the load circuit. The retard coil 54 also serves to prevent abrupt discharges from the condensers 56 and 57 in case of a short circuit. A secondary winding 58 coupled to the autotransformer 50 supplies heating current to the cathode 39 of the rectifier tube 56.

In case the current on the supply conductors 34 and 35 goes above normal value the voltage across the load circuit is reduced to reduce the current flow through the direct current winding 45 of the reactor 37. A reduction in the flux produced by the winding 45 increases the impedance of the windings 43 and 44 on the reactor 37 to reduce the current flow on the load circuit. In case the current flow on the load conductors 34 and 35 falls below normal value an opposite operation to that described above takes place. The constants of the reactor 37 are so proportioned that the impedance of the reactor 37 changes rapidly with a change in the load resistance within the normal operating range. This change in the impedance of the reactor 37 compensates for any change in the load resistance. The constants of the reactor 38 are so proportioned that the direct current flowing through the winding 49 saturates the core 46 and the impedance of the reactor is low in value throughout the range in which the reactor 37 tends to maintain constant current.

When the load resistance goes above the constant current range the reactor 37 is saturated by the current flow through the winding 45. The impedance of the reactor 37 in the circuit of the transformer 51 is very small and changes very little with increase in the direct current through the winding 45. Therefore, the impedance of the reactor 37 no longer decreases fast enough to compensate for the increase in load resistance so that the load current decreases instead of remaining constant even if the load voltage rises. When the current on the load circuit decreases there is a decrease in the current flow through the winding 49 of the reactor 38. The decrease in the current flow through the winding 49 increases the impedance of the reactor 38. When the load circuit is opened there is no current flow through the winding 49 and the impedance of the reactor 38 is at a maximum. The magnetizing current for the transformer 51 is adjusted at open load circuit for causing sufficient voltage drop by the reactor 38 to limit the voltage applied to the rectifier 36 and accordingly to limit the voltage on the load circuit.

Modifications in the circuits and in the arrangement and location of parts may be made within the spirit of the scope of the invention and such modifications are intended to be covered by the appended claims.

What is claimed is:

1. In a regulated rectifier, a constant potential alternating current supply circuit, a direct current load circuit, a transformer and a rectifier connected between the supply circuit and the load circuit, inductive impedance means in the primary circuit of said transformer, and direct current feedback means from said load circuit continuously operative for controlling said impedance means to maintain the load current substantially constant up to a predetermined maximum load voltage and operative only upon the occurrence of abnormally great load voltages to prevent the load voltage going above a predetermined value.

2. In a regulated rectifier, a transformer and a full wave rectifier connected between a constant potential alternating current supply circuit and a direct current load circuit, inductive impedance means in the primary winding circuit of said transformer, feedback means from said load circuit for controlling said impedance means to maintain the load current substantially constant up to a predetermined maximum load voltage, and means comprising a feedback circuit energized by the voltage across the load circuit for controlling said impedance to set an upper limit to the voltage fluctuations on the load circuit due to variations in the load.

3. In a regulated rectifier, an alternating current supply circuit, a direct current load circuit, a transformer and a rectifier connected between the supply circuit and the load circuit, variable inductance means in the primary circuit of said transformer, and direct current feedback means to said inductance means from the load circuit controlled according to the operation of the load circuit for governing said inductance means to control the voltage and current characteristics of the load, said feedback means being continuously operative to maintain one of said characteristics substantially constant up to a predetermined maximum value of the other of said characteristics and operative only upon the occurrence of an abnormally great value of said other characteristic to hold said other characteristic below a predetermined value, said feedback means comprising two separate windings supplied by current derived from said load circuit to increase and decrease respectively the inductance of said variable inductance means.

4. In a regulated rectifier, a constant potential alternating current supply circuit, a direct current load circuit, a transformer and a full wave rectifier connected between said circuit and the load circuit, a reactor having a three-legged core, two alternating current windings respectively mounted on the outside core legs and connected in series with the primary winding of said transformer, two oppositely wound direct current windings mounted on the central core leg, and means for energizing said direct current windings from the load circuit to maintain the load current constant up to a predetermined maximum load voltage and to limit the voltage on the load circuit respectively.

5. In a regulated rectifier, a constant potential alternating current supply circuit, a direct current load circuit, a rectifier connected between said supply circuit and the load circuit, a reactor having a three-legged core, alternating current windings respectively mounted on the outside core legs and connected in series with the supply circuit, two direct current windings mounted on the central core leg, means for energizing one of said direct current windings according to the potential across the load circuit to maintain the load current substantially constant up to a predetermined maximum load voltage, and means for energizing the second direct current winding only when the load voltage is raised to a predetermined value to limit the load voltage.

6. In a regulated rectifier, a constant potential alternating current supply circuit, a direct current load circuit, a rectifier connected between said supply circuit and the load circuit, a transformer in the supply circuit adjacent to said rectifier, a reactor having a three-legged core, alternating current windings respectively mounted on the outside core legs, two direct current windings mounted on the central core leg, a feedback circuit connected across the load circuit for energizing one of said direct current windings to control said reactor and maintain the load current substantially constant up to a predetermined maximum load voltage, and a second feedback circuit connected across said load circuit and having a cold cathode tube included therein for energizing the second direct current winding to produce a flux opposing the flux of the first direct current winding only when the voltage on the load circuit reaches a predetermined value.

7. In combination, a constant potential supply circuit, a direct current load circuit, a rectifier connected between the supply circuit and the load circuit, two magnetically independent reactors each comprising a three-legged core, two alternating current windings respectively mounted on the outside core legs and a direct current winding mounted on the central core leg, the two alternating current windings on each of said reactors being connected in series in the supply circuit, means for energizing the direct current winding on one of said reactors according to the voltage across the load circuit to control the reactor and maintain the load current constant up to a predetermined maximum load voltage, and means for energizing the direct current winding on the other reactor only when the load voltage reaches a predetermined value to control the reactor and limit the load voltage.

8. In combination, a constant potential supply circuit, a direct current load circuit, a rectifier connected between the supply circuit and the load circuit, a reactor comprising a three-legged core, two alternating current windings respectively mounted on the outside core legs and two direct current windings mounted on the central core leg, the two alternating current windings being connected in series in the supply circuit, means for energizing one of the direct current windings according to the voltage across the load circuit to control the reactor and maintain the load current constant up to a predetermined maximum load voltage, and means comprising a cold cathode tube in a feedback circuit connected across the load circuit for energizing the other direct current winding upon ignition of the tube to limit the voltage on the load circuit.

9. In a regulated rectifier, a full wave rectifier connected between a constant potential alternating current supply circuit and a direct current load circuit, inductive impedance means in the alternating current supply circuit connected to said rectifier, means comprising a circuit connected in series with the load circuit for varying said impedance according to the load circuit current to prevent excessive rise of the load voltage, and means for varying said impedance means in inverse relation to the load circuit voltage to maintain the load current substantially constant up to a predetermined maximum load voltage.

10. In a regulated rectifier, a constant potential alternating current supply circuit, a direct current load circuit, a rectifier connected between said supply circuit and the load circuit, inductive impedance means in the alternating current supply circuit connected to said rectifier, two direct current windings for controlling said impedance means, a feedback circuit connected in shunt with said load circuit for governing one of said direct current windings to maintain the load circuit current substantially constant throughout a desired range, and a feedback circuit energized according to the current in the load circuit for governing the other of said direct current windings and reducing said inductive impedance to a uniformly low value throughout said range, permitting it to become substantial in amount only when the current drops below said range, thus preventing the load circuit voltage going above a predetermined value.

11. In combination, a constant potential supply circuit, a direct current load circuit, a rectifier connected between the supply circuit and the load circuit, two magnetically independent reactors each comprising a three-legged core, two alternating current windings respectively mounted on the outside legs and a direct current winding mounted on the central leg, the two alternating current windings on each of said reactors being connected in series in the supply circuit, means for energizing the direct current winding on one of said reactors according to the load circuit voltage to maintain the load current substantially constant up to a predetermined maximum load voltage, and means for energizing the direct current winding on the other reactor according to the load circuit current to limit the load voltage.

12. In combination, a constant potential alternating current supply circuit, a direct current load circuit, a rectifier connected between the supply circuit and the load circuit, variable inductive impedance means connected between the supply circuit and the load circuit, means responsive to variations in the load current for varying said inductive impedance means in a sense to maintain the load current constant independently of variations in the load, said means being continuously operative over a comparatively wide range of load current variations, and means responsive to variations in the load voltage only in excess of a preassigned amount for increasing the impedance value of said variable impedance means to prevent the occurrence of excessive load voltages.

13. In combination, a constant potential alternating current supply circuit, a direct current load circuit, a rectifier connected between the supply circuit and the load circuit, variable inductive impedance means connected between the supply circuit and the load circuit, means responsive to variations in the load current for varying said inductive impedance means in a sense to maintain the load current constant independently of variations in the load, said means being continuously operative over a comparatively wide range of load current variations, and means responsive to variations in the load voltage only in excess of a preassigned amount for increasing the impedance value of said variable impedance means to prevent the occurrence of excessive load voltages, said voltage-control means comprising an on-and-off device arranged to be activated only on the occurrence of load voltages in excess of a preassigned amount and to increase the impedance of said variable impedance means only when so activated.

14. In combination, a constant potential alternating current supply circuit, a direct current load circuit, a rectifier connected between the supply circuit and the load circuit, two alternating current windings connected in the supply circuit, a direct current winding coupled with each of said alternating current windings in a manner to cause variation of the reactance of each alternating current winding in dependence on the direct current in the winding coupled thereto, one of said direct current windings being connected in shunt with said load circuit and constructed to vary the reactance of said alternating current winding under control of the voltage of said load circuit throughout a comparatively wide load current range, the other of said direct current windings being connected in series with said load circuit and constructed to produce uniformly low reactance of the alternating current winding coupled thereto over the major part of said current range and high reactance when said load voltage rises to a value in excess of a preassigned amount due to abnormally high load resistance.

15. In combination, a constant potential alternating current supply circuit, a direct current load circuit, a rectifier connected between the supply circuit and the load circuit, two separate magnetically saturable cores, an alternating current winding and a direct current winding coupled to each of said cores, said alternating current windings being connected in said supply circuit and constituting variable reactance elements therein, the direct current winding coupled to one of said cores being connected in shunt with said load circuit and constructed to vary the saturation of said core and consequently the reactance of the alternating current winding coupled to said core in response to load voltage variations throughout a wide range below a stipulated upper limit and in a sense to maintain the load current constant independent of load variations, the direct current winding coupled to the other core being connected in series with said load circuit and constructed to produce substantially complete saturation of its core to produce a uniformly low reactance of the alternating current winding coupled to said other core throughout said range, while allowing said core to become unsaturated and consequently said reactance value to become large when the load current falls below a stipulated value, to prevent the load voltage from exceeding a preassigned limit.

16. In combination, a constant potential alternating current supply circuit, a direct current load circuit, a reactor element connected in series with said supply circuit and including a magnetically saturable core, two windings magnetically coupled to said core, each connected in a separate shunt circuit to said load circuit, said windings being oppositely poled with respect to said load circuit, and a voltage-controlled switching device connected in circuit with one of said windings, said switching device being adjusted to establish a current through said last-named winding upon the occurrence of a predetermined excessive load voltage, said windings being so proportioned that the magnetic flux due to one of said windings is offset by the magnetic flux due to the other of said windings.

17. In combination, a constant potential supply circuit, a variable impedance element connected in series with said supply circuit, a load circuit, means arranged to be energized in proportion to the load voltage for reducing the impedance of said element as the load voltage is increased and tending to maintain constancy of load current, and other means energized in proportion to the load voltage but operative only when said load voltage exceeds a predetermined value, for neutralizing the action of said first-named means.

LOUIS E. MILARTA.